3,107,552
HYDRODYNAMIC TORQUE CONVERTER
Albert Finsterwalder, Cologne-Bruck, Germany, assignor to Klockner-Humboldt-Deutz Aktiengesellschaft, Cologne, Germany
Filed Apr. 4, 1961, Ser. No. 100,656
6 Claims. (Cl. 74—645)

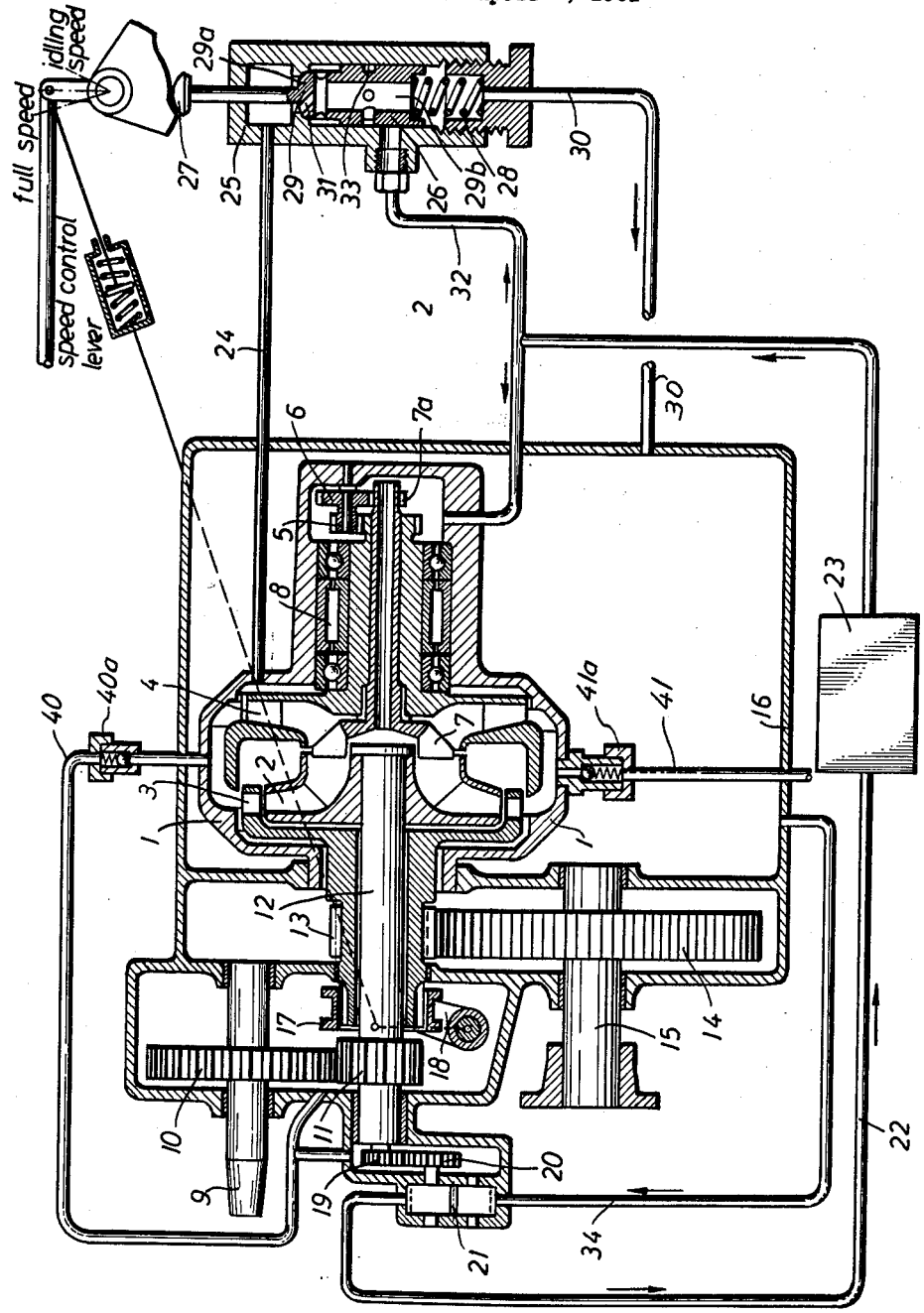

The present invention relates to a hydrodynamic torque converter which is equipped with a feed pump and throttling means for throttling the discharge from the converter in order to produce a converter pre-pressure (Vordruck).

When in a hydraulic transmission the converter is bridged by a mechanical clutch for obtaining the direct velocity range, it is necessary to control the converter by the simplest means possible in such a way that when the clutch is engaged no power will be consumed. Furthermore, with hydromechanical compound transmissions, in which the torque converter is followed by a mechanical stepdown shiftable transmission or reversing transmission, it is necessary to make the torque converter ineffective during the shifting operation for purposes of interrupting the power flow.

The above mentioned two steps are effected with heretofore known torque converters by completely emptying the converter. This, however, has the drawback that not only the emptying but also the refilling of the converter requires time and the employment of a relatively large feed pump.

It is also known to make the torque converter ineffective by disengaging its pump from the drive by means of a shiftable clutch, and to provide a free wheel drive in the output. The provision of a shiftable clutch and the free wheel drive requires considerable additional costs and space and is, therefore, frequently for reasons of space alone not feasible. Particularly when great power is to be transmitted as is the case for instance with the drive of heavy locomotives, such shiftable clutches and free wheel drives cause considerable difficulties with regard to construction and operation.

Another heretofore known way of interrupting the power flow through the converter consists in disengaging the guiding apparatus by means of a brake which latter holds the guiding apparatus stationary when the torque converter is made effective. With such an arrangement, the circuit may remain filled. Such an arrangement is, however, feasible only with so-called tri-lock transmissions but not for instance with converters with a two-part guiding apparatus in which the two sectional guiding apparatuses are coupled to each other through the intervention of gear transmissions and, by means of a free wheel transmission, are so arranged that the guiding apparatus disengages itself when the slip has dropped beyond a certain amount and when the torque converter continues to operate at a high degree of efficiency as a mere coupling. With such a torque converter, it is in contrast to the tri-lock transmission not possible that the pump, the guiding apparatus and the turbine will together rotate with the fluid filling of the converter without any material throughput.

It is, therefore, an object of the present invention to provide an arrangement of the general character mentioned above, which will overcome the above outlined drawbacks.

It is another object of this invention to provide a hydrodynamic torque converter system which will make it possible also with converters with a two-part guiding apparatus to effect a simple and quick disengagement of the converter without emptying the same.

These and other objects and advantages of the invention will appear more clearly from the following specification in connection with the accompanying drawing showing a section through a hydrodynamic torque converter and the valve for reducing the converter pre-pressure, said valve being shown on an exaggerated scale with regard to that of the converter.

The present invention is characterized primarily by an air-tight design of the converter housing and by the employment of a relief valve which is intended to permit a substantially throttling-free discharge of the fluid from the converter while reducing the pre-pressure.

Experience has shown that for purposes of making a torque converter ineffective, it is by no means necessary to empty the entire circuit. It will rather be sufficient to reduce as far as possible the converter pre-pressure. In this way, the flow losses will be small when the converter is engaged and the torque transmitted during the idling period will be low. The guiding apparatus adapted to be disengaged by means of a free wheel drive will rotate at relatively low speed only while the converter is engaged, which fact is important for the wear of the bearings. By the same operation, the starting torque will drop to a fraction of the otherwise occurring torque, which starting torque is also at reduced driving speed normally still so high that the shifting of a mechanical shiftable gear following the converter is rather difficult.

The above phenomena may be explained by the fact that when the pre-pressure depending on the torque converter design drops below a certain value, the flow at the entrance to the pump will entirely or partly be torn off, and the through-flow and thereby the power transmission will be greatly reduced.

For purpose of simplifying the hydraulic system, it is rather advantageous according to the present invention to provide the valve body of the relief valve itself with a permanently open passage which serves as throttling station for the discharge from the converter when the latter is in its effective position.

Since, depending on the dimensioning of the hydraulic conduits and on the relief valve in the discharge line from the converter, also when opening the relief valve there may in certain circumstances still prevail a relatively high flow resistance making impossible a complete reduction or relief of the converter pre-pressure, this reduction or relief of the pre-pressure may, if desired, according to the present invention be aided by simultaneously with the opening of the relief valve, connecting the supply line, which leads from the feed pump to the converter, to a pressureless return conduit while the converter remains filled. For instance, the valve body of the relief valve may be connected to the valve member governing the communication between supply line and return line so as to move together with said valve body or to be integral therewith. When opening the last mentioned valve, a portion of the fluid delivered by the feed pump will bypass the converter and will directly in a short circuit return to the oil sump so that also from the feeding side, the pre-pressure occurring in the converter will be reduced.

With hydrodynamic torque converters bearings in or on the converter, for instance in a gear transmission, which bearings require lubrication, are frequently supplied with a lubricant by lubricating conduits leading from the interior of the converter toward the outside. Frequently, it is also customary to provide cleaning passages which lead toward the outside from the lowest point of the torque converter and are continuously open and through which soil, chips or the like collected in the converter housing may be withdrawn outwardly into the oil sump. In order to obtain the air-tightness of the converter housing, which air-tightness is necessary in order to realize the present invention, it is advantageous to mount outwardly opening check valves in such lubricating conduits. Such check valves will not impede the lubrication and withdrawal of impurities but will prevent the air from entering the torque converter housing if a sub-atmospheric pressure should be established therein upon reduction of the pre-pressure by releasing fluid from the upper portion of the converter to the reservoir located beneath the converter.

In order to automate the servicing of the converter as far as possible, according to a further development of the invention, the relief valve and, if desired, also the valve controlling the communication between the supply line and return line may open automatically when the clutch bridging the torque converter is being engaged and/or when adjusting the motor driving the torque converter for idling. The shifting of these valves may be effected in any desired manner, for instance mechanically, hydraulically, pneumatically or electrically.

Referring now to the drawing in detail, the arrangement shown therein comprises a stationary housing 1 of the torque converter having arranged therein an impeller 2, a turbine 3, a main guiding apparatus 4 and a control guiding apparatus 7 drivingly connected to the main guiding apparatus 4 through the intervention of a gear transmission 5, 6 journalled in the converter housing and gear 7a. When looking in flow direction, the control guiding apparatus 7 is located behind the main guiding apparatus 4 and is driven by the main guiding apparatus at an increased speed. The main guiding apparatus 4 is by means of a free wheel drive 8 journalled in the converter housing 1 in such a way that when the slip drops below a certain magnitude, the main guiding apparatus will detach itself and subsequently thereto the converter will operate as a mere coupling. The control guiding apparatus 7 will in this connection prevent the main guiding apparatus from reaching too high a speed of rotation.

Pump or impeller 2 is driven by the input shaft 9 through a gear transmission 10, 11 and shaft 12. The output is effected from turbine 3 through a gear transmission 13, 14 to the output shaft 15. The housing, which houses the entire converter and the transmissions as well as the oil sump, is designated with the reference numeral 16. By slipping the shift sleeve 17 over gear 11, pump 2 and turbine 3 may be directly mechanically coupled to each other to make effective the direct velocity range. The movement of the shift sleeve 17 is effected by means of a shift fork 18.

For purposes of cooling the oil in the converter and to establish a converter pre-pressure in housing 1, the converter is supplied with oil by a feed pump 21 which is driven by shaft 12 through the intervention of gears 19 and 20 and feeds the oil into a supply line 22 having interposed therein a cooler 23. The discharge from the torque converter is effected through a conduit 24 leading from an upper portion of the housing 1 and having interposed therein a two-fold valve 25 with a valve body or valve spool 26. Valve body 26 is adapted, for instance by means of a manually operable knob 27 to be displaced downwardly against the thrust of a spring 28 as a result of which valve cone 29 will be lifted off its seat 29a and will release a practically unthrottled passage from conduit 24 through inner chamber 29b of valve body 26 and the pressureless return line 30 leading downwardly to the oil sump which is beneath the converter. The valve cone 29 is provided with a passage 31 which is open also when the valve is closed. This passage 31 acts as throttle and limits the discharge from the engaged torque converter while bringing about the establishment of a converter pre-pressure. It is a matter of course that spring 28 of valve cone 29 must be so dimensioned that the valve cannot be pressed open by the desired converter pre-pressure. At an excessive pre-pressure the valve cone 29 will move downwardly against spring 28 and release fluid from the converter and thus reduce the pre-pressure to the desired value. Such movement of the valve cone in this manner will not, however, uncover conduit 32. This occurs only when the valve cone is moved by the cam actuating the knob 27.

The reduction or elimination of the pre-pressure during the opening of the relief valve 26, 29 is aided and accelerated when, during the opening of said valve, a branch line 32 connected to the supply line 22 is through a control groove 33 likewise connected to the inner chamber 29b and thereby to the pressureless return line 30. As a result thereof, a portion of the oil delivered by the feed pump 21 will bypass the converter and directly return to the oil sump from which the feed pump 21 draws oil through conduit 34.

The arrangement preferably includes a lubricating line 40 leading from the top of the converter casing to the gears 10, 11 and 19, 20 and which conduit includes a check valve 40a opening away from casing 1. A clean out conduit 41 can also be provided leading from the bottom of casing 1 and including a check valve 41a opening away from casing 1.

It will be appreciated that the converter is not emptied according to the present invention and thus there is not the need for filling the converter to make it effective when this is desired. It will be understood that a motor means, such as an internal combustion engine would be connected to the input shaft 9 while a load would be connected to output shaft 15. The engine speed would be controlled by the speed control member connected to the throttle of the engine. A cam connected to the control member opens valve member 26 in the engine idling position of the control member and also in the position therein in which there is engagement of gear 11 by shift sleeve 17. This latter condition corresponds to direct drive higher speed operation of the transmission.

It is, of course, to be understood that the present invention is, by no means, limited to the particular construction shown in the drawing but also comprises any modifications within the scope of the appended claims.

What I claim is:

1. In combination: a hydrodynamic torque converter having an input and an output shaft and a casing with an inlet and an outlet, a pump drivingly connected to said input shaft and having its discharge side connected directly to said converter inlet, a fluid reservoir beneath the converter to which the suction side of the pump is connected, a restricted passage leading from the converter outlet to said reservoir whereby a pre-pressure is maintained in the converter because of the continuous supply of fluid thereto by said pump, and means for reducing said pre-pressure without emptying said converter comprising a conduit leading from the converter outlet to said reservoir and the highest point of said conduit being near the level of the top of converter casing, and a normally closed control valve in said conduit, said valve having first opening means operable independently of the converter pre-pressure for fully opening said valve to establish unrestricted communication between said converter outlet and said reservoir thereby to reduce the converter pre-pressure substantially to zero.

2. The combination according to claim 1 wherein, said valve has second opening means in the form of fluid pressure responsive means hydraulically connected to the converter outlet to be acted on by the converter pre-pressure and operable in response to a predetermined excessive converter pre-pressure to open said valve only partially to relieve the said excessive pre-pressure and thereby establish a condition of normal pre-pressure in the converter.

3. The combination according to claim 2 which includes; conduit means connected to the discharge side of the pump and leading to the control valve and blocked by the control valve in the normal position thereof, said valve being operable when in its fully open position only to connect said conduit means to said reservoir to by-pass at least part of the pump delivery away from said converter.

4. The combination according to claim 1 which includes; a mechanical transmission having a first element connected to said input shaft and a second element connected to said output shaft and including a third shiftable element having a first position wherein said first and second elements are disconnected and a second position wherein said first and second elements are connected for directly drivingly interconnecting said input and output shafts, and means connecting said shiftable element with said first valve opening means for actuation of said control valve into fully open position in response to movement of said shiftable element into its said second position.

5. The combination according to claim 4 wherein; said input shaft is adapted for connection to a variable speed drive means, a control element adapted for connection to the speed control of the drive means and adjustable from a drive means idling position in a direction to increase the speed of the drive means, and means connecting said control element to said shiftable element for movement thereof into the said second position thereof in response to movement of said control element in the direction to increase the speed of said drive means.

6. The combination according to claim 4 wherein; said input shaft is adapted for connection to a variable speed drive means, a control element adapted for connection to the speed control of the drive means and adjustable from a drive means idling position in a direction to increase the speed of the drive means, and means connecting said control element to said shiftable element for movement thereof into the said second position thereof in response to movement of said control element in the direction to increase the speed of said drive means, said means connecting said control element with said first valve opening means also being operable for actuating the control valve to fully open position in response to movement of said control element into drive means idling position.

References Cited in the file of this patent

UNITED STATES PATENTS

| | | |
|---|---|---|
| 2,450,161 | Price | Sept. 28, 1948 |
| 2,860,747 | Kelley | Nov. 18, 1958 |
| 2,875,643 | Kelley | Mar. 3, 1959 |
| 2,896,663 | Mena | July 28, 1959 |
| 2,934,976 | Herndon | May 3, 1960 |
| 3,004,446 | Flinn | Oct. 17, 1961 |
| 3,010,342 | Kelley | Nov. 28, 1961 |